Dec. 12, 1961    E. VOZNAK    3,013,208
MEANS FOR IMPROVING THE RESOLUTION OF A DIGITAL TIMER
Filed Feb. 12, 1959    2 Sheets-Sheet 1

INVENTOR
*EDWIN VOZNAK*

Dec. 12, 1961 E. VOZNAK 3,013,208
MEANS FOR IMPROVING THE RESOLUTION OF A DIGITAL TIMER
Filed Feb. 12, 1959 2 Sheets-Sheet 2

INVENTOR
EDWIN VOZNAK

United States Patent Office 3,013,208
Patented Dec. 12, 1961

3,013,208
MEANS FOR IMPROVING THE RESOLUTION
OF A DIGITAL TIMER
Edwin Voznak, 4100 W St. NW., Washington, D.C., assignor to the United States of America as represented by the Secretary of the Army
Filed Feb. 12, 1959, Ser. No. 792,928
3 Claims. (Cl. 324—68)
(Granted under Title 35, U.S. Code (1952), sec. 266)

The invention described herein may be manufactured and used by or for the Government for governmental purposes without the payment to me of any royalty thereon.

This invention relates generally to electronic timing circuits, and more particularly to electronic circuit means in combination with a digital counter which makes possible an increase in the resolution of the digital time measurement provided by the counter without requiring a concomitant increase in the counting rate.

In a number of applications where the ultimate in counting rate is employed in a given digital timer, it would be very advantageous to be able to increase the resolution provided without having to employ additional counters or a counter having greater resolution. Or, if it is desired to design a digital timer having a given resolution, it would be desirable to be able to provide a simpler slower-speed counter which will achieve the necessary resolution without having to get into the complexities required of a conventional high resolution counter. These advantages are of considerable importance in applying digital timing techniques to military applications, such as guided missiles, where space is at a premium.

Accordingly, it is the chief object of this invention to provide circuit means in combination with a digital counter which makes possible an increase in the resolution provided by the counter without increasing the counting rate.

An additional object is to incorporate this invention in a pulsed radar system to digitally measure the elapsed time between a transmitted pulse and its received echo pulse.

In accordance with the present invention greater resolution is provided for a given digital counter by effectively delaying the stop pulse which would ordinarily stop the counter for a time proportional to the elapsed time being measured. In one embodiment of the invention incorporated in a radar system, this is accomplished by circuit means including a sawtooth generator which is started at the same time that a digital counter is started in response to the transmission of a pulse of the radar system. The received echo pulse, instead of being fed to stop the counter, as is conventionally done, is fed to trigger a screen-coupled phantastron tube circuit whose plate voltage is caused to follow the voltage rise of the output of the sawtooth generator. When triggered, the phantastron tube plate voltage immediately begins to fall at a linear rate from the voltage to which it had risen in following the output of the saw tooth generator. As is well known, this linear fall of plate voltage continues until the plate voltage "bottoms." The screen grid voltage immediately rises to a higher voltage when the phantastron circuit is triggered and immediately returns to its initial value when the plate voltage "bottoms." A differentiating circuit forms this return of the screen grid voltage into a stop pulse which is applied to stop the counter. Since the time it takes for the phantastron plate voltage to fall to its "bottoming" value is dependent upon the plate voltage of the phantastron circuit at the time of triggering, and the plate voltage is determined by how long it has been since the sawtooth was triggered, it will be understood that the amount of time the stop pulse is delayed is proportional to the elapsed time between the transmitted pulse and the received echo pulse. The reading of the counter will thus be equal to the elapsed time between transmitted and received pulses multiplied by a multiplication factor determined by the rate-of-rise of the sawtooth wave and the rate-of-fall of the phantastron tube plate voltage. The multiplication which occurs effectively increases the resolution of the digital counting measurement.

The specific nature of the invention, as well as other objects, uses, and advantages thereof, will clearly appear from the following description and from the accompanying drawing, in which.

Figure 1:
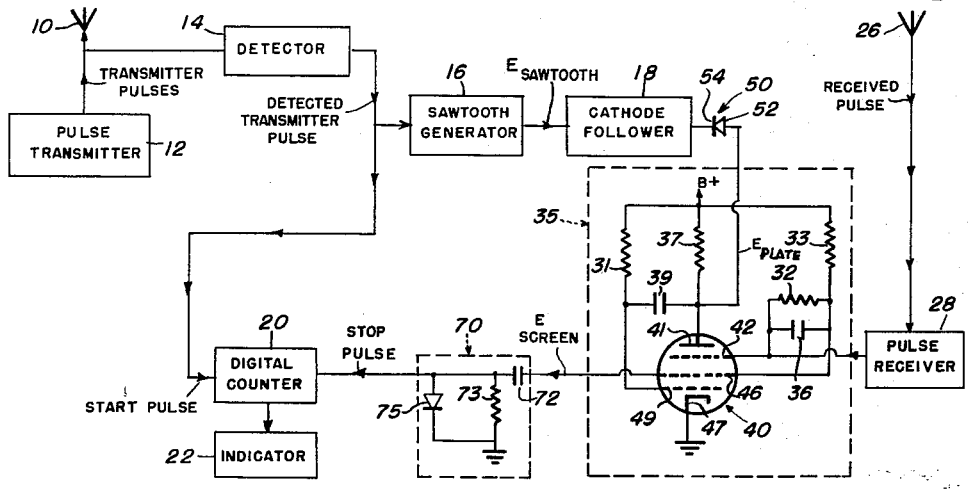
FIG. 1 is a circuit and block diagram of an embodiment of the invention incorporated in a pulsed radar system for providing a measurement of the elapsed time between the transmitted pulses and the received echo pulses.
Figure 2:
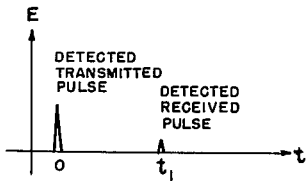
FIGS. 2–5 are graphs illustrating the voltages at various points in the embodiment of FIG. 1.
Figure 3:
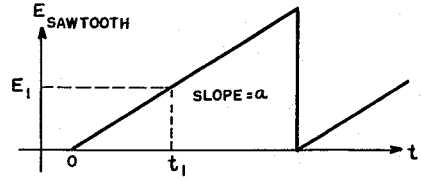

In FIG. 1, a pulse transmitter 12 feeds a transmitting antenna 10 which radiates the transmitter pulses to a target (not shown). The transmitter pulses are also fed to a detector 14. The detected transmitter pulses from the detector 14 are applied to (1) trigger a sawtooth generator 16 at the repetition rate of the transmitted pulses and (2) start the counter 20. Sawtooth generators having a repetition rate determined by external trigger pulses are well known in the art. The output of the sawtooth generator 16 is fed to a cathode follower 18 to provide a sawtooth voltage having a low impedance output. A detected transmitter pulse is illustrated in FIG. 2 and for purposes of explaining the operation of the embodiment of FIG. 1, it will be assumed to start at zero time as shown. The sawtooth output of the sawtooth generator 16 and the cathode follower 18 are shown in FIG. 3. The sawtooth wave is started at zero voltage by the detected transmitter pulse and increases linearly until returned to zero voltage by the next detected transmitter pulse. The rate-of-rise or slope of the sawtooth wave will be represented as $a$. Although only a single transmitter pulse and a single sawtooth are shown in FIGS. 2 and 3, it is to be understood that the operation repeats with each transmitter pulse.

The received echo pulses are picked up by a receiving antenna 26 and fed to a conventional pulse receiver 28 which detects and amplifies the received pulses to provide detected received pulses at its output. Ordinarily, each output pulse from the receiver 28 would be fed to stop the digital counter 20, but in order to provide greater resolution the output pulses from the receiver 28 are first fed to a screen-coupled phantastron tube circuit 35.

The phantastron tube circuit 35 comprises a vacuum tube 40 having a plate 41, a suppressor 42, a screen grid 46, a control grid 49 and a grounded cathode 47. The tube 40 is of the type conventionally used in phantastron circuits, such as a 6AS6 tube, for example. A plate resistor 37 is connected between a source of D.-C. voltage B+ and the plate 41 of the tube 40, a control grid resistor 31 is connected between B+ and the control grid 49, and a screen grid resistor 33 is connected between B+ and the screen grid 46. A capacitor 39 is connected between the plate 41 and the control grid 49, while a capacitor 36 in parallel with a resistor 32 is connected between the suppressor grid 42 and the screen grid 46. The values of the above-mentioned components are chosen in accordance with well known principles to provide conventional screen-coupled phantastron operation. A typical screen-coupled phantastron tube circuit of this type with exemplary values is shown on page 197, Fig. 5.46 of the Massachusetts Institute of Technology, Radiation Laboratory Series, volume 19, entitled "Wave Forms." It is to be understood that the values shown are only exemplary and may be varied as desired within the scope of this invention.

Figure 4:
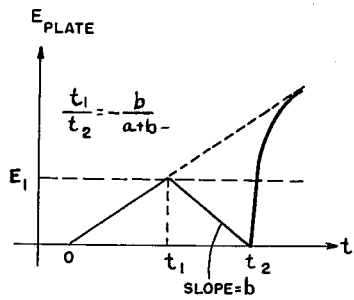
Figure 5:
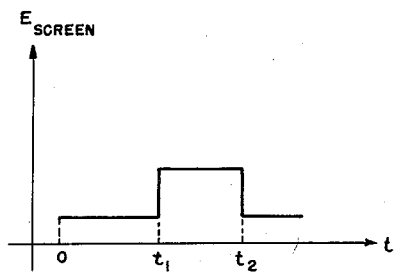

The operation of the screen-coupled phantastron tube circuit 35 is illustrated by the graphs of FIGS. 4 and 5. The plate voltage of the plate 41 of the tube 40 is caused to follow the rising sawtooth voltage output of the cathode follower 18 by connecting the plate 41 to the output of the cathode follower 18 by means of a diode 50 having its plate 52 connected to the plate 41 and its cathode 54 connected to the low-impedance sawtooth output of the cathode follower 18. As can be seen from FIG. 4, the voltage on the plate 41 thus initially rises from zero following the sawtooth voltage of FIG. 3 at a slope equal to $a$. The pulse receiver 28 is adapted to feed a positive pulse, corresponding to the received echo pulse at time $t_1$, to the supperssor grid 42 to trigger the phantastron circuit 35. When the phantastron circuit 35 is triggered, it will be seen that the plate voltage immediately begins to fall at a linear rate from the voltage to which it had risen in following the sawtooth voltage output of the cathode follower 18. As is well known, this linear fall of plate voltage continues until the plate voltage "bottoms" at time $t_2$, that is, runs against the "knee" in the plate curve. Those skilled in the art will understand that this linear fall of plate voltage proceeds at a slope essentially dependent upon the time constant determined by the resistor 31 and the capacitor 39. This slope will be represented as $b$. The diode 50 isolates the sawtooth output of the cathode follower 18 so that upon triggering the linear fall of plate voltage until "bottoming" is unaffected by the sawtooth voltage. After "bottoming" at time $t_2$ the plate voltage rapidly rises to a value equal to the value to which the sawtooth output of the cathode follower 18 has risen as shown in FIG. 4.

As can be seen from FIG. 5, when the phantastron circuit 35 is triggered at time $t_1$, the screen voltage immediately rises to some higher value and remains at this value until the plate "bottoms" at time $t_2$, whereupon the screen voltage then immediately falls to its initial value. The screen grid is connected to a differentiating circuit 70 comprising a capacitor 72 connected to circuit ground through the parallel combination of a resistor 73 and a diode 75 poled to short out positive signals. The differentiating circuit 70 thus provides substantially no output pulse when the screen grid voltage immediately rises upon triggering at time $t_1$ but when the screen grid immediately returns to its initial voltage when "bottoming" occurs at time $t_2$, a negative pulse appears at the output of the differentiating circuit 70. This negative pulse from the differentiating circuit 70 is then fed as a stop pulse to the digital counter 20 which is adapted to stop in response thereto. The output of the counter 20 is thus a measure of the time $t_2$, rather than the time $t_1$, as would be the case if the received pulse were fed directly to stop the counter 20. It can be seen that the amount of time $(t_2-t_1)$ that the stop pulse is delayed is proportional to the elapsed time $t_1$, between the transmitted pulse and the received echo pulse, since the time it takes for the phantastron plate voltage to fall to its "bottoming" value is dependent upon the plate voltage at the time $t_1$ of triggering, and the plate voltage at time $t_1$, is determined by the time $t_1$ since the phantastron circuit 35 was triggered. The relationship between the times $t_1$ and $t_2$ can be shown mathematically to be substantially expressed by the slopes $a$ and $b$ as shown by the equation in FIG. 4. It will be understood by those skilled in the art that this type of relationship between times $t_1$ and $t_2$ effectively achieves a greater resolution than could be provided by employing the counter 20 in a conventional manner. It will also be understood that when the above described digital measuring technique is employed in a radar system, the total elapsed time $t_2$ must necessarily be less than the total time between transmitter pulses. Since the digital measuring system of this invention will ordinarily be used in radar systems to improve the resolution of short distance measurements, keeping $t_2$ less than the time between transmitter pulses offers no problem. In any case, those skilled in the art will readily be able to adjust the slopes $a$ and $b$ to provide the desired multiplication factor for a given situation.

The output of the binary counter 20 may be fed to any suitable indicator 22 to make use of the digital time measurement. This indicator 22 may be a meter calibrated to read distance corresponding to the elapsed time $t_1$ between transmitted and received pulses. Or, the indicator 22 might comprise suitable circuitry for providing a desired output in response to a predetermined distance measurement.

Figure 6:
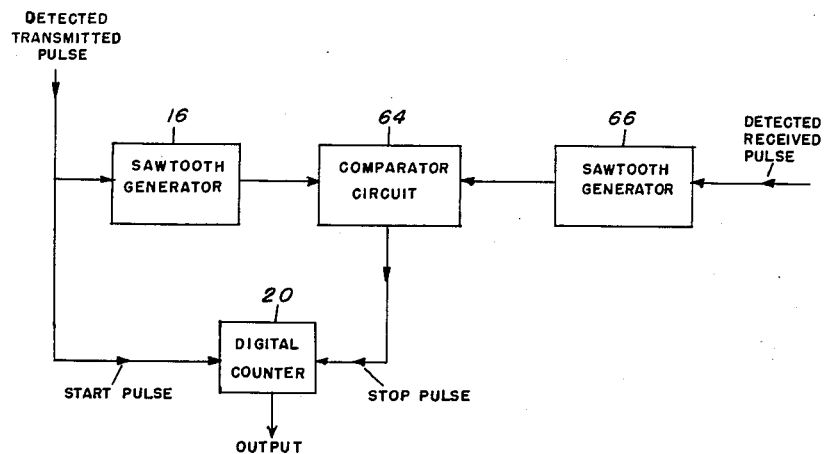
FIG. 6 is a block diagram of another embodiment of the invention.

FIG. 6 is another embodiment of the invention. The detected transmitter pulses, which are fed to the digital counter 20, are also fed to the sawtooth generator 16, as is done in the embodiment of FIG. 1. Instead of feeding the detected received pulses to a phantastron circuit 35, as was done in the embodiment of FIG. 1, the detected received pulses are fed to trigger a second sawtooth generator 66 having a slope $b'$ substantially greater than the slope of the first sawtooth generator 16. Both the sawtooths of generators 16 and 66 have the same repetition rate as the transmitted pulses, but the sawtooth of the generator 16 is triggered by the detected transmitter pulse while the sawtooth of the generator 66 is triggered by the detected echo pulse. The respective outputs of the sawtooth generators 16 and 66 are fed to a comparator circuit 64 adapted to provide a stop pulse at its output when the sawtooth output voltages of the sawtooth generators 16 and 66 become equal. Comparator circuits which perform this function are well known in the art and can readily be provided.

Figure 7:
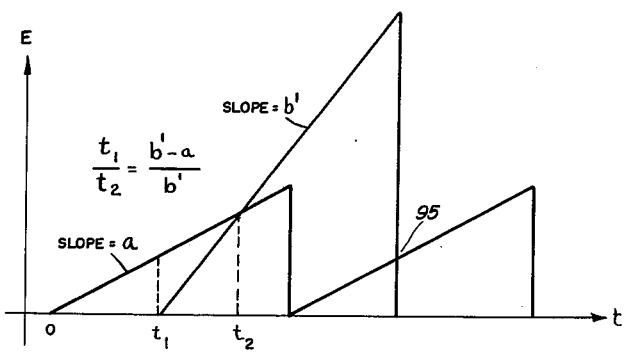
FIG. 7 is a graph illustrating the voltage outputs of the sawtooth generators in the embodiment of FIG. 6.

The operation of the embodiment of FIG. 6 can now be explained by referring to the graph of FIG. 7 which shows two sawtooths of the generator 16 and one sawtooth of the generator 66. At zero time, the detected transmitter pulse triggers the sawtooth generator 16 causing its sawtooth output to rise at a slope $a$. Upon receipt of the received echo pulse at time $t_1$, the sawtooth generator 66 is triggered and rises at a slope $b'$, which is substantially greater than the slope $a$ of the sawtooth generator 16. At time $t_2$, the rising voltage of the sawtooth generator 66 catches up with the slower rising voltage of the sawtooth generator 16, whereupon the comparator circuit 64 is adapted to produce a stop pulse in response to attaining of this equality by the two sawtooths. This stop pulse is fed to stop the counter 20. The relationship between the times $t_1$ and $t_2$ for this embodiment can be shown mathematically to be substantially expressed by the equation in FIG. 7. It should be noted that the sawtooths also momentarily become equal at the point represented by 95 in FIG. 7 where an output pulse from the comparator circuit would not be desired. Since this equality only is present for a very short time compared to the equality at time $t_2$, the frequency response of the comparator circuit 64 can readily be adjusted to ignore this momentary equality.

Although the embodiments disclosed have been shown incorporated in a radar system, it is to be understood that this invention, which permits the resolution of a digital counter to be increased without requiring a concomitant increase in the counting rate, can be employed in any other desired digital counting application. Also, although sawtooth waves have been employed in the disclosed embodiments, any other rising or falling waves may be used in place thereof, such as the exponential rise or fall of a charging capacitor. It will be apparent, therefore, that the embodiments shown are only exemplary and that various modifications can be made in construction and arrangement within the scope of the invention as defined in the appended claims.

I claim as my invention:

1. Electronic circuit means for measuring the time elapsed between first and second pulses generated by first and second means, said electronic circuit means comprising in combination: a digital counter having first and second counter inputs and adapted to start counting when a pulse is applied to said first counted input and stop counting when a pulse is applied to said second counter input, means connecting said first means to said first counter input so that said first pulse starts said counter, a first sawtooth generator connected to said first means so as to be triggered by said first pulse, said first sawtooth generator providing a first linearly rising sawtooth voltage at its output, a second sawtooth generator connected to said second means so as to be triggered by said second pulse, said second sawtooth generator providing a second linearly rising sawtooth voltage at its output, the rate-of-rise of said second sawtooth voltage being substantially greater than that of said first sawtooth voltage, and a comparison circuit to which said first and second sawtooth voltages are fed, said comparison circuit adapted to provide an output pulse when said first and second sawtooth voltages become equal, and means feeding the output pulse of said comparison circuit to said second counter input to stop said counter, the digital time measurement provided by said counter thereby being greater than the elapsed time between said first and second pulses by a predetermined multiplication factor.

2. Electronic circuit means for measuring the time elapsed between first and second pulses generated by first and second means, said electronic circuit means comprising in combination: a digital counter having first and second counter inputs and adapted to start counting when a pulse is applied to the first counter input and stop counting when a pulse is applied to the second counter input, means connecting said first means to said first counter input so that said first pulse starts said counter, a sawtooth generator connected to said first means so as to be triggered by said first pulse, said sawtooth generator providing a linearly rising sawtooth voltage at its output, a screen-coupled phantastron tube circuit connected to said second means so as to be triggered by said second pulse, the triggering of said phantastron circuit causing its screen grid voltage to immediately rise to a higher value and its plate voltage to fall linearly until "bottoming" occurs whereupon the screen grid voltage immediately falls to its initial value, means for connecting said sawtooth generator to said phantastron circuit so that when said phantastron circuit is triggered by said second pulse, the plate voltage of said phantastron circuit has a value dependent upon the voltage to which said sawtooth voltage has risen after said sawtooth generator is triggered by said first pulse, and means connected between said phantastron circuit and said second counter input and adapted so that a pulse is applied to stop said counter in response to the immediate fall of said screen grid voltage to its initial value at "bottoming," the digital time measurement provided by said counter thereby being greater than the elapsed time between said first and second pulses by a predetermined multiplication factor.

3. An electronic circuit for accurately measuring the time T between the transmittal of a first pulse and the receipt of a second pulse, comprising: a digital counter having start and stop inputs, means for applying said first pulse to said start input for starting the counter, means responsive to said second pulse for producing a stop pulse at a time $T+(n/m)T$ after the transmittal of said first pulse, where $n$ and $m$ are integers and $m$ is greater than $n$, and means applying said stop pulse to said stop input for stopping the digital counter, thus providing an accurate indication of the time T.

References Cited in the file of this patent

UNITED STATES PATENTS

| | | |
|---|---|---|
| 2,513,988 | Wolff et al. | July 4, 1950 |
| 2,568,926 | Moran | Sept. 25, 1951 |
| 2,626,313 | Napolin | Jan. 20, 1953 |
| 2,740,112 | Goldberg | Mar. 27, 1956 |
| 2,852,769 | Plouffe | Sept. 16, 1958 |